United States Patent [19]
Gallo et al.

[11] Patent Number: 5,140,683
[45] Date of Patent: Aug. 18, 1992

[54] METHOD FOR DISPATCHING WORK REQUESTS IN A DATA STORAGE HIERARCHY

[75] Inventors: Frank D. Gallo; Lori A. Mains; Donald P. Warren, Jr., all of Tucson, Ariz.

[73] Assignee: International Business Machines Corporation, Armonk, N.Y.

[21] Appl. No.: 317,493

[22] Filed: Mar. 1, 1989

[51] Int. Cl.$^5$ .............................................. G06F 13/14
[52] U.S. Cl. ............................ 395/425; 364/DIG. 1; 364/DIG. 2; 364/957.1; 364/964.6; 364/238.4; 364/254.3
[58] Field of Search ............... 364/200 MS, 900 MS

[56] References Cited

U.S. PATENT DOCUMENTS

| | | | |
|---|---|---|---|
| 3,623,006 | 11/1971 | Balakian et al. | 364/200 |
| 4,056,848 | 11/1977 | Gilley | 364/200 |
| 4,399,503 | 8/1983 | Hawley | 364/200 |
| 4,429,363 | 1/1984 | Duke et al. | 364/200 |
| 4,490,782 | 12/1984 | Dixon et al. | 364/200 |
| 4,533,995 | 8/1985 | Christian et al. | 364/200 |
| 4,583,166 | 4/1986 | Hartung et al. | 364/200 |
| 4,636,946 | 1/1987 | Hartung et al. | 364/200 |
| 4,638,424 | 1/1987 | Beglin et al. | 364/200 |

OTHER PUBLICATIONS

IBM Technical Disclosure Bulletin, "Enhanced Disk Task Sequencing", vol. 29, No. 5, Oct. 1986, pp. 1946-1948.
IBM Technical Disclosure Bulletin, "Dynamically Maintained Command Chains", vol. 24, No. 12, May 1982, pp. 6605-6606.
IBM Technical Disclosure Bulletin, "Synchronized Rotating Storage Devices Utilizing Sector Queuing", vol. 12, No. 6, Nov. 1696, pp. 818-819.
IBM Technical Disclosure Bulletin, "Priority Circuit for Servicing Requests Queued by Sector", vol. 12, No. 6, Nov. 1696, pp. 815-817.

Primary Examiner—Gareth D. Shaw
Assistant Examiner—Brian L. Klock
Attorney, Agent, or Firm—M. W. Schecter; F. E. Anderson

[57] ABSTRACT

A method for dispatching work requests in a data storage hierarchy in which directory data is promoted in variable length spans, the use of which are maximized even for work requests entering the work request queue after the span is chosen, is disclosed. A queue of work requests is initially scanned to determine if any requests therein require access to directory data stored in secondary storage within a prescribed proximity of that required by the next request to be dispatched. If such other work requests exist, then directory data in addition to that required by the next request to be dispatched is also promoted. To minimize seek time and rotational latency, the additional data is promoted from secondary storage in a single device I/O cycle. The additional data is chosen by adjusting the outer limits of the span as each work request in queue is scanned. After the actual promotion of the span of data, the existing work request is completed. Upon the ensuing scan of the queue the dispatch of any work requests stored therein and requiring access to data previously promoted is next completed. The additionally promoted data, known to be required by other work requests in the queue, is thus certain to be accessed before subsequent migration. The priority completed requests include those requests added to the queue after the span of data was promoted.

7 Claims, 2 Drawing Sheets

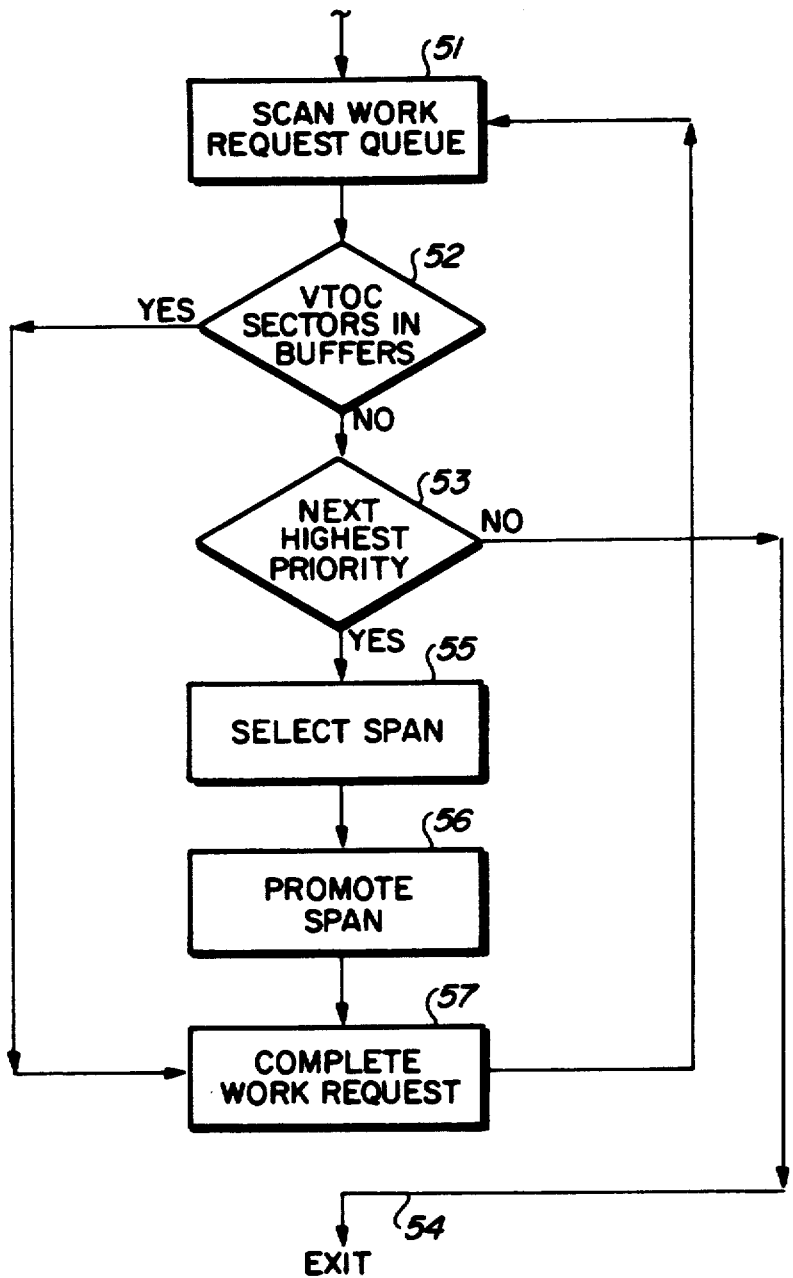

METHOD FOR DISPATCHING WORK REQUESTS IN A DATA STORAGE HIERARCHY

BACKGROUND OF THE INVENTION

1. Field of the Invention

The present invention relates to processing work requests in a data storage hierarchy. More particularly, the invention relates to transferring data between memory levels and the prioritization of the dispatch of work requests in a data storage hierarchy.

2. Discussion of the Related Art

Computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

Because today's computers require large quantities of data storage capacity, computer memory is available in many forms A fast but expensive form of memory is main memory, typically comprised of microchips. Other available forms of memory are known as peripheral storage devices and include magnetic direct access storage devices (DASD), magnetic tape storage devices, optical recording devices, and magnetic or optical mass storage libraries. Each of these other types of memory has a greater storage density and thus lower cost than main memory. However, these other memory devices do not provide the performance provided by a main memory. For example, the time required to mount a tape or disk in a tape drive, DASD, or optical disk drive and the time required to properly position the tape or disk beneath the read/write mechanism of the drive cannot compare with the rapid, purely electronic data transfer rate of main memory. It is inefficient to store all of the data in a computer system on but a single type of memory device. Storing all of the data in main memory is too costly and storing all of the data on one of the peripheral storage devices reduces performance.

A typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often referred to as secondary data storage, and so on. Generally, the highest level of the hierarchy has the lowest storage density capability, highest performance and highest cost. As one proceeds down through the levels of the hierarchy, storage density generally increases, performance generally decreases, and cost generally decreases. By transferring data between different levels of the hierarchy as required, the cost of memory is minimized and performance is maximized. Data is thus stored in main memory only so long as it is expected to be required by the processor. The hierarchy may take many forms, include any number of data storage or memory levels, and may be able to transfer data directly between any two distinct memory levels.

In a typical computer using main memory as primary data storage and a peripheral storage device as secondary data storage, the processor can only access data for executing instructions if the data is stored in main memory. If work to be done by the processor requires data not then stored in main memory, the processor will recall or promote data from the peripheral storage device to main memory. The promotion of data may employ I/0 channels, controllers, or cache memories well known in the art.

The time required for data to be promoted from peripheral storage to main memory must be minimized to prevent any impact on the performance of the processor. The time required to promote data is determined by various characteristics of the particular peripheral storage device and the data storage hierarchy. For example, in the promotion of data from an optical or magnetic disk drive to main memory, assuming the proper disk is already mounted on the drive, the processor must wait while the read/write mechanism or head of the disk drive is positioned radially over the disk track containing the data to be promoted. This delay is known as "seek" time. The processor must also wait until the rotation of the disk brings the relevant data on the track directly underneath the read/write head. This delay is known as "rotational latency". Finally, the processor must wait for the actual electronic transfer of the data sensed by the head.

Several techniques are known for improving the efficiency of data promotion in data storage hierarchies. The IBM Technical Disclosure Bulletin, Vol. 29, No. 5, October 1986, pgs. 1946-1948 discloses minimizing disk seek time by sequencing tasks based on disk access requirements of the tasks. The tasks are examined to determine the location where on a disk the task access is to occur. More particularly, the radial position of the access location relative to the current radial position of the head is examined such that the task next chosen to be performed will require minimal radial movement of the head.

Techniques are also known for minimizing rotational latency. For example, the IBM Technical Disclosure Bulletin, Vol. 12, No. 6, November 1969, pgs. 815-819 discloses the queuing of requests for data transfer according to the rotational position on the disk of the data for which access is required. A distinct queue exists for each sector or rotational position on the disk. As each sector approaches the head, the queue for that particular sector is interrogated and a work request is extracted therefrom and dispatched. Rotational latency is reduced by dispatching only those work requests requiring access to data already in convenient rotational position.

The IBM Technical Disclosure Bulletin, Vol 24, No. 12, May 1982, pgs. 6605-6606 also discloses a technique for improving host processor efficiency. This technique is applicable to a computer system having multiple processors. In such a system, a processor requiring access to a particular peripheral storage device reserves a data path to such device. The work requests remaining outside of a nearly exhausted chain of requests for accessing a particular peripheral data storage device are examined to determine if any such work requests require access to the same peripheral storage device as that for the chain. Such work requests may be generated after the nearly exhausted requests are chained. If such work requests are found, they are secondarily chained to the original chain of requests for that particular peripheral storage device. The data path between the processor and the peripheral storage device may thus be preserved, thereby preventing another processor from reserving the relinquished data path to the same peripheral device. If another processor was to gain access to that data path, and all other data paths to that peripheral storage device were in use, the processor which relinquished the data path would not be able to resume communication with the peripheral storage device, as required.

Although each of the aforementioned techniques improves data transfer in a data storage hierarchy, thus improving processor efficiency, further improvements are possible. None of the aforementioned techniques reduces the number of storage device I/O cycles required to be devoted to the transfer of data between levels of the data storage hierarchy. Each of the aforementioned techniques requires a distinct storage device I/O cycle or device access for each unit of data that is required to be promoted. If the number of such cycles required is reduced, the efficiency of the system is clearly improved.

Some techniques are known for reducing the number of device accesses required to peripheral storage devices. U.S. Pat. No. 4,583,166 discloses the promotion of the entire track of data containing the record(s) to which access is required for a work request. The promotion of additional data permits the processor, upon needing access to other record(s) from the promoted track, to retrieve such other record(s) from main memory instead of the peripheral storage device. Because some of the data required by the processor is promoted to main memory in advance, the speed with which the processor gains access to that data is increased. This technique is particularly useful where all of the data on the track is related such that access to any particular record on that track indicates a likelihood that other data on that track will also be accessed in the future.

U.S. Pat. Nos. 4,399,503 and 4,490,782 also disclose the promotion of data in addition to that immediately required by the processor. In U.S. Pat. No. 4,399,503 the additional data is simply a fixed number of additional data records sequentially located on the disk after the required record. Again, the promotion of additional data may reduce the number of accesses to the disk required by the processor. In U.S. Pat. No. 4,490,782, the additional data is determined by an index linking data records both likely to be accessed within a certain period of time. Thus, when some of the records from a linked group of data is accessed, additional records from that group are also promoted.

Although the promotion of data in addition to that immediately required by the processor will reduce peripheral storage device accesses, there is no guarantee that such additionally promoted data will actually be next used by the processor. If the level of storage to which data is to be promoted is filled, some of the data thereon will be demoted to a lower level in the hierarchy to make room for the incoming data. It is thus possible for additionally promoted data to migrate out of the level of the hierarchy to which it was promoted before the processor attempts to access such data at the promoted level of the hierarchy. In such instances, there is no improvement to the efficiency of the hierarchy because the promotion of additional data was not useful to the processor. The aforementioned techniques are thus dependent on the likelihood of access to the additionally promoted data before that data migrates back out of the hierarchy level to which it was promoted.

SUMMARY OF THE INVENTION

The primary object of the subject invention is an improved method for dispatching work requests in a data storage hierarchy.

Another object of the invention is the reduction of the number of seek operations, seek time, rotational latency and number of data accesses to a peripheral storage device in a data storage hierarchy.

Yet another object of the invention is the promotion of data in addition to that immediately required by the processor such that the likelihood of use of such additional data prior to the data being migrated is maximized.

Yet another object of the invention is the prioritized execution of work requests requiring access to additionally promoted data, even if such requests were not present in the work request queue at the time the additional data for promotion was chosen.

These and other objects are accomplished by a method for dispatching work requests in a data storage hierarchy in which directory data is promoted in variable length spans, the use of which are maximized even for work requests entering the work request queue after the span is chosen. A queue of work requests is initially scanned to determine if any requests therein require access to directory data stored in secondary storage within a prescribed proximity of that required by the next request to be dispatched. If such other work requests exist, then directory data in addition to that required by the next request to be dispatched is also promoted. To minimize seek time and rotational latency, the additional data is promoted from secondary storage in a single device I/O cycle. The additional data is chosen by adjusting the outer limits of the span as each work request in the queue is scanned. After the actual promotion of the span of data, the existing work request is completed. Upon the ensuing scan of the queue the dispatch of any work request stored therein and requiring access to data previously promoted is next completed. The additionally promoted data, known to be required by other work requests in the queue, is thus certain to be accessed before subsequent migration. The priority completed requests include those requests added to the queue after the span of data was promoted. Thus, the number of device accesses is further reduced by completing those requests entering the queue which by coincidence also require access to the additionally promoted data.

The foregoing and other objects, features and advantages of the invention will be apparent from the following, more particular description of the preferred embodiments of the invention as illustrated in the accompanying drawing.

BRIEF DESCRIPTION OF THE DRAWING

FIG. 3 is a diagrammatic showing of one addressable sector of the disk illustrated in FIG. 2.

FIG. 4 is a flowchart showing a set of machine executed operations for implementing the present invention.

DETAILED DESCRIPTION OF THE PREFERRED EMBODIMENT

Figure 1:
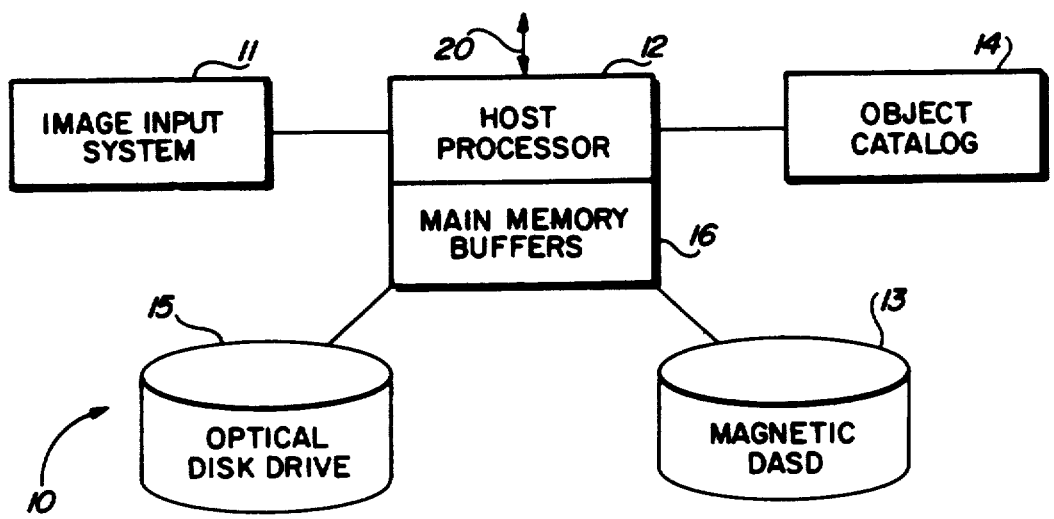
FIG. 1 is a schematic block diagram of a data storage hierarchy in which the present invention may be advantageously practiced.

Referring now more particularly to the drawing, like numerals denote like features and structural elements in the various figures. In the preferred embodiment of the invention, the method of dispatching work requests operates in the environment of a data storage hierarchy for the archiving and accessing of image and other data. The data is stored in data units known as objects. Referring to FIG. 1, objects enter image processing system 10 via image input system 11. Image input system 11 may include a document sensor or reader (not shown) for converting document recorded data into electronic image data objects, as is known.

Image input system 11 provides the objects to host processor 12 which may initially store the objects on magnetic DASD 13. Double-headed arrow 20 indicates that processor 12 may be operatively connected to other processors (not shown) or other computer systems, as is known. In addition, DASD 13 may be shared among a plurality of processors (not shown) for manipulating the received objects. While processor 12 is processing objects, it keeps track of the accumulated objects and their associated control information in its own internal control structures. Also, processor 12 maintains an object catalog 14 for indicating to all processors and users the objects stored in DASD 13. DASD 13 stores the received objects at least until processor 12 schedules the objects for migration to optical disk drive 15. In the preferred embodiment of the invention, optical disk drive 15 is an optical write-once, read-many disk drive. DASD 13 may retain a copy of the objects therein after optical disk drive 15 receives and stores a copy of the objects. Also, host processor 12 may initially store the objects on optical disk drive 15.

Optical disk drive 15 exists within a random access optical disk storage library (not shown) having a plurality of such optical disk drives therein. The library has an open sided storage area for storing a plurality of optical disks, one disk per storage cell of the storage area. A transfer device moves the optical disks between storage cells and the optical disk drives under the control of processor 12. Such library operations are known in the art. In alternative embodiments of the invention, image processing system 10 may also include read-write optical storage devices, magnetic tape drives, and/or magnetic tape libraries or a variety of other peripheral storage devices as secondary storage to host processor 12.

Processor 12 prepares a list of the objects stored in DASD 13 to be copied from DASD 13 to optical disk drive 15. While building chains of objects to be stored in optical disk drive 15, processor 12 transfers objects from DASD 13 into chains built in its main memory buffers 16. When processor 12 determines that an integral number of objects, having a total data byte capacity of a given range, are stored in buffers 16, then processor 12 activates optical disk drive 15 for the receipt of the chained objects. Transfer of the objects similarly requires the transfer of associated control information from catalog 14 to optical disk drive 15. In addition, catalog 14 must be updated to reflect the transfer of the objects. Catalog 14 is stored on fast access magnetic DASD (not shown) and provides access to objects stored in image processing system 10. Catalog 14 includes identification, status and location information for all objects stored in image processing system 10.

Optical disks mounted on optical disk drive 15 may be moved from optical disk drive 15 to one of the optical library storage cells. The optical disks may also be removed from the optical library and placed in simple shelf storage. The storage devices available to image processing system 10 can be arranged in numerous combinations of a hierarchy of two or more levels, each level including one or more types of storage devices. In the preferred embodiment, main memory buffers 16 are considered primary storage and DASD 13 and optical disk drive 15 are considered secondary storage. It is possible to view DASD 13 and optical disk drive 15 as being of different hierarchy levels, but objects are not directly transferable therebetween, and such would be of no consequence to the invention. By secondary storage, it is simply meant that the peripheral storage devices are of relatively lower hierarchy level than the primary storage. The invention is thus not limited to the type of primary or secondary storage, but simply the transfer of data between different hierarchy levels, wherever in the hierarchy they may be.

Figure 2:
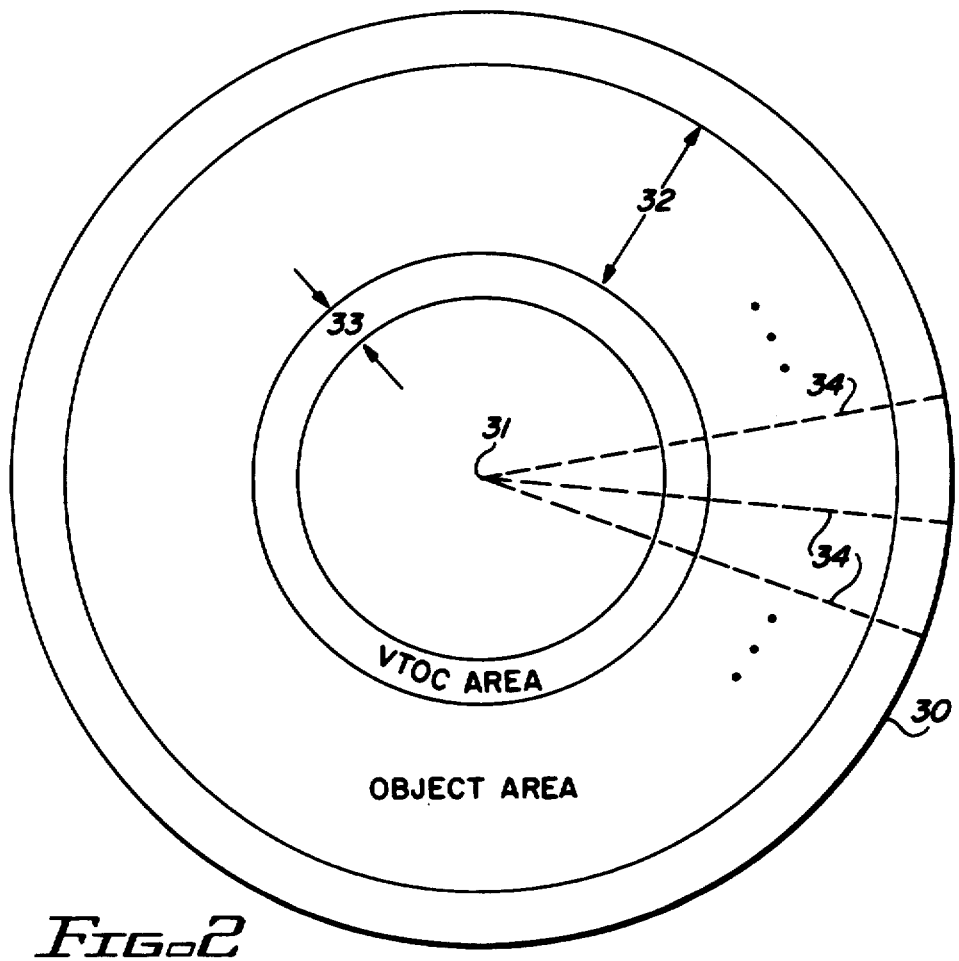
FIG. 2 is a diagrammatic showing of an optical disk of the write-once, read-many type with which the present invention may be advantageously practiced.

The optical disks in image processing system 10 may be capable of storing information on one or both sides thereof, and in the preferred embodiment store information on both sides. In either case, the data stored on a single side of the disk is known as a volume. Referring now to FIG. 2, the format of a volume of optical disk 30 will now be described. When disk 30 is supported in optical disk drive 15 it is rotated about axis 31 so that data stored thereon may be positioned under an optical actuator. Disk 30 contains a single spiral track or multiple concentric tracks upon which data may be recorded. One or more optical actuators (not shown) is mounted in optical disk drive 15 so as to be capable of being positioned radially over a specific portion of a spiral track or over a specific concentric track for track seeking. A first radial portion 32 of disk 30 is logically reserved for the storage of objects. Radial portion 33 is logically reserved for storage of a directory, also known as the volume table of contents (VTOC). Embossed or otherwise permanently inserted into the recording surface of disk 30 are a plurality of radially extending lines 34 which denote the circumferential boundaries of addressable recording blocks or sectors of disk 30. Lines 34 are equally angularly spaced apart and may include a recorded radial address of the immediately following sector (i.e., track address) as well as the circumferential or angular position of the following sector (i.e., sector number). Lines 34 are disposed entirely around disk 30. A radial index mark may also be provided.

A given number of objects to be recorded on disk 30 are collected into a group and may be recorded during a single access to disk 30 for enhancing the operation of image processing system 10. For example, a minimal number of bytes of information may be required before an access to disk 30 is permitted. Such minimal number of bytes may require a plurality of control information or VTOC sectors for storing integral multiples of said given number of VTOC entries during a single access. This requirement fills a plurality of VTOC sectors with VTOC entries. For limiting the buffering of data before recording on disk 30, a maximum number of bytes can be accumulated irrespective of whether or not an integral number of addressable sectors are used to store VTOC entries identifying the objects to be recorded.

VTOC area 33 contains entries which describe and store the disk address of each object stored in a volume, one VTOC entry per object. A disk address includes the name and location of an object on disk 30, as well as other parameters. Each addressable sector of the VTOC may contain up to twelve VTOC entries. As objects are recorded in object area 32 of disk 30, an equal number of VTOC entries are recorded in VTOC area 33. This technique conserves storage space on disk 30 by maximizing the use of sectors for the storage of VTOC information. Note that a VTOC entry is actually data used as control information in the storage of objects, also data.

Objects and VTOC entries are recorded on disk 30 using allocation techniques which are well known. One goal of such allocation techniques is the maximization of the number of objects or VTOC entries which are stored in each addressable sector. In the preferred embodiment, each sector of disk 30 consists of 1024 data bytes. Up to 55 VTOC sectors may be promoted in a single device I/O cycle or access.

A sample VTOC sector 40 is shown in FIG. 3. Sector 40 includes sector header 41, a series of VTOC entries 42, and possibly a padding area 43 not containing any data. Sector header 41 includes sector identification and the number of VTOC entries in the sector. VTOC entries 42 include the name of an object, its length, the lowest sector number in object area 32 storing the object, the number of sectors occupied by the object, and the date and time of recording. Other control information may also be included, as may be desired.

Referring to FIG. 4, the method of dispatching work requests according to the invention will now be described. The data storage hierarchy of image processing system 10 includes DASD 13, optical disk drive 15, buffers 16 and any other storage device included therein. A logical queue (not shown) maintains therein work requests for processor 12. The work requests are for various types of operations including the writing or reading of information in the hierarchy, and the entry, ejection or labeling of volumes stored in the hierarchy. The dispatching of work requests is prioritized to maximize efficiency. For example, work requests requiring access to data stored on a disk already mounted in optical disk drive 15 may be given priority over all other work requests in the queue. Work requests of the same general priority are dispatched on a first-in, first-out basis.

Read work requests generally require two transfers of data from secondary storage to buffers 16. Assuming that the desired object to be read is not already present in buffers 16, the object(s) must be promoted from secondary storage to the buffers. The volume containing the desired object is first located using catalog 14. The volume directory must than be used to locate the object. Assuming the object is stored on an optical disk already mounted in optical disk drive 15, the VTOC entry for the respective object is promoted into buffers 16, the object address is located, and the dispatch of the work request is subsequently completed by promoting the object itself to buffers 16.

Assuming that there is no work request in the work request queue for the reading of an object already present in buffers 16, the highest priority is given to dispatching certain types of read requests. The highest priority read request is that for which the VTOC entries for the objects to be read are already present in buffers 16. The next highest priority read request is that requiring access to but a single VTOC sector, the address of which is already known to processor 12. The first step 51 in dispatching work requests is thus the scanning of the work request queue to prioritize the dispatching of work request therein. Next, step 52 is a branching step dependent upon whether or not any work request in the queue require the reading of objects for which VTOC entries are already stored in buffers 16. If such is the case, the method skips ahead to final step 57 wherein such work requests are immediately dispatched. If no such work request is found, branching step 53 is encountered. Step 53 branches according to whether or not a work request is found in the queue which requires the reading of an object for which a single VTOC sector is specified in the work request. If no such "next highest priority" work request is found in the queue, the current method is exited at arrow 54. For example, the remaining highest priority work request may specify the reading of an object for which a single VTOC sector is not specified in the work request. Also, the remaining highest priority work request may be a write request. If such "next highest priority" work request is found, the method continues to the next step 55.

At step 55 a span of VTOC entries are selected for promotion from optical disk drive 15 to buffers 16. A "span" is a physically contiguous set of VTOC sectors, for example, as stored on a particular track of an optical disk. Because the span selected at step 55 is to be promoted to buffers 16 at step 56, the maximum length of a span is coincident with the maximum number of VTOC sectors capable of being transferred during a single device I/O cycle (i.e., 55 sectors). The exact length and the precise position of the span is determined by the remaining work requests in the queue which require access to VTOC sectors stored within 54 sectors of that required for the current work request. The only requirement of the span selected for promotion is that it must contain the VTOC sector required by the next highest priority work request selected in step 53. The span of sectors is therefore a variable length, contiguously stored set of up to 55 sectors in length, chosen from a window of 109 contiguous sectors. (the 109 contiguous sector window includes the VTOC sector required by the next highest priority work request determined in step 53 and the 54 VTOC sectors stored consecutively therefore or consecutively thereafter.) The actual span selected in step 55 includes as many of the VTOC sectors required by other work requests in the queue as possible. The position of the selected span is chosen by adjusting the outer limits of the span as each work request in the queue is scanned until the 55 sector limit is reached. The length of the span is minimized because sectors not required by any work requests in the queue cannot exist at either end of the span.

After the span is selected at step 55 it is promoted from optical disk drive 15 to buffers 16 at step 56. At step 57, the VTOC sector required by the next highest priority work request chosen in step 53 is now present in buffers 16, thereby enabling completion of the dispatch of such work request. Following such completion, the method loops back to step 51 wherein the work request queue is again scanned. At step 52, work request requiring access to objects for which the VTOC sectors were promoted in step 56 are given priority completion. Because the work request queue was scanned anew, the priority completion of the work requests will include those work requests added to the work request queue during/since a previous scan of the work request queue at step 51. Even though such additional work requests were not present in the queue during the first cycle of steps 51 through 57, efficiency of the system is improved through the recognition that such work requests may now be completed without additional VTOC sector promotion. Finally, if no such work request requiring access to objects for which VTOC sectors were promoted in step 56 of the previous cycle, the method continues on to step 53 to select a new work request for dispatch. In such a manner, the dispatch of work requests is prioritized so as to maximize the efficiency of the overall system.

An example of the operation of the invention will now be described. The example assumes that steps 51-53 have resulted in a next highest priority request to be dispatched which requires access to the $150^{th}$ VTOC sector. The span of data to be promoted must thus e chosen to be between the $96^{th}$ and $204^{th}$ VTOC sectors (i.e. within 54 sectors of the $150^{th}$ th VTOC sector) and must include the $150^{th}$ VTOC sector.

As part of the example, the scan of the work request queue at step 51 determined that seven other work requests are in the queue. These seven work requests require access to the $80^{th}$, $100^{th}$, $110^{th}$, $120^{th}$, $195^{th}$, $200^{th}$ and $250^{th}$ VTOC sector respectively. The $80^{th}$ and $250^{th}$ VTOC sectors are not within 54 VTOC sectors of the $150^{th}$ VTOC sector and thus cannot be within the span selected at step 55. Because the span cannot be more than 55 VTOC sectors in length, it can be chosen to include the $150^{th}$, and $200^{th}$ VTOC sectors or the $100^{th}$, $110^{th}$, $120^{th}$ and $150^{th}$ VTOC sectors—but not all of them. In fact, because the VTOC sectors are spaced so far apart, any span including the $195^{th}$ VTOC sector cannot also include a VTOC sector preceding the $140^{th}$ VTOC sector, and any span including the $120^{th}$ VTOC sector cannot also include any VTOC sectors after the $175^{th}$ VTOC sector. Thus, no more than three of the required VTOC sectors (the $100^{th}$, $110^{th}$, and $120^{th}$) can be included in a contiguous 55 VTOC sector span containing the $150^{th}$ VTOC sector.

The actual span selected will depend on the order the work requests appear in queue. Initially, the span includes only the VTOC sector required by the next highest priority work request. The outer limits of the span are adjusted as each work request in the queue is scanned until the 55 sector limit is reached. The span selected will thus depend upon the order of the work requests in the queue. In the aforementioned example, the span is initially a single VTOC sector in length; more specifically, the $150^{th}$ VTOC sector. The first of the five required VTOC sectors (those within 54 sectors of the $150^{th}$ VTOC sector—the $100^{th}$, $110^{th}$, $120^{th}$, $195^{th}$ and $200^{th}$ VTOC sectors) to be encountered in the scan of the queue will determine the selected- span For example, if the $110^{th}$ VTOC sector is encountered first, the span will be adjusted to include the $110^{th}$ through $150^{th}$ VTOC sectors. The maximum size of the span then precludes inclusion of the $195^{th}$ or $200^{th}$ VTOC sectors When the $100^{th}$ VTOC is encountered the span would be adjusted again to include the $100^{th}$ through $150^{th}$ VTOC sectors. Similarly, if the $195^{th}$ or $200^{th}$ VTOC sector is encountered first, the final span selected will include the $150^{th}$ through $200^{th}$ VTOC sectors, and so on. At the expense of additional overhead, the span could be selected so as to include as many required VTOC sectors as possible.

The selected span is promoted at step 56 and the original work request requiring access to the $150^{th}$ VTOC sector is completed at step 57. Upon returning to step 51, those work requests requiring access to any other promoted VTOC sectors are identified. The identified work requests include those requiring access to VTOC sectors as identified at step 51 of the previous cycle, plus any work requests since added to the queue also requiring access to any of the promoted VTOC sectors. The dispatching of identified work requests is then completed at steps 52 and 57 before that of any other work requests.

While the invention has been particularly shown and described with reference to preferred embodiments thereof, it will be understood by those skilled in the art that various changes in form and details may be made therein without departing from the spirit and scope of the invention. For example, various data storage hierarchy structures and data storage formats may be used without any affect on the subject invention. Accordingly, the invention disclosed herein is to be limited only as specified in the following claims.

What is claimed is:

1. A method for dispatching work requests in a data storage hierarchy, the data storage hierarchy including primary storage, secondary storage, a processor connected to primary storage and to secondary storage, the processor being capable of promoting a span of directory data from secondary storage to primary storage in a single execution cycle, a queue containing a first, a second, and other work requests, the first, second, and other work requests requiring the promotion of first, second, and other directory data, respectively, the method comprising the machine executed steps of:

dispatching a request for promoting the first directory data required by the first work request;
   determining the span of directory data which includes at least the first directory data and the second directory data by adjusting the length of the span as each work request in the queue is scanned;
   promoting the determined span of directory data from secondary storage to primary storage;
   first completing the first work request; and
   next completing any work requests present in the queue requiring some of the promoted directory data upon completing the first work request, before dispatching any requests for promoting other directory data required by the other work requests present in the queue.

2. The method of claim 1 wherein the next completing step includes the step of determining whether any work requests added to the queue during and after said promoting step, but before dispatching a request for promoting other directory data required by any of the other work requests present in the queue, requires some of the promoted directory data.

3. The method of claim 2 wherein the step of next completing includes the completion of those work requests added to the queue during and after said promoting step and requiring some of the promoted directory data before dispatching a request for promoting other directory data required by any of the other work requests present in the queue, the completion of such work requests including the use of the directory data in primary storage to locate and promote an object in secondary storage.

4. The method of claim 1 wherein said step of determining the span of directory data includes adjusting the length of the span such that the span begins with either the first directory data or the second directory data and ends with either the first directory data or another directory data.

5. The method of claim 4 wherein the step of next completing includes determining whether any work requests added to the queue during an after said promoting step, but before dispatching a request for promoting other directory data required by any of the other work requests present in the queue, requires some of the promoted directory data.

6. The method of claim 5 wherein the step of next completing includes the completion of those work requests added to the queue during and after said promoting step requiring some of the promoted directory data before dispatching a request for promoting other directory data required by any of the other work requests present in the queue, the completion of such work requests including the use of the directory data in primary storage to locate and promote an object in secondary storage.

7. A data storage hierarchy comprising:
  secondary storage;
  primary storage including a queue containing a first, second, and other work requests requiring the promotion of first, second, and other data, respectively, in secondary storage; and
  a processor connected to primary storage and to secondary storage, the processor including means for determining a span of data including the first and the second data by adjusting the length of the span as each work request in the queue is scanned, for promoting the span of data from secondary storage to primary storage in a single execution cycle, for completing the first work request, and for subsequently completing any work request, in the queue, requiring some of the promoted data, including the second work request and such work requests added to the queue during the completion of the first work request, before dispatching any requests for promoting other data required by the other work requests.

* * * * *